(12) United States Patent
Beki

(10) Patent No.: US 8,662,534 B2
(45) Date of Patent: Mar. 4, 2014

(54) ROLLOVER PROTECTION SYSTEM WITH ROLLOVER BODY WHICH CAN BE PIVOTED OUT

(76) Inventor: Gürkan Beki, Engelskirchen (DE)

(*) Notice: Subject to any disclaimer, the term of this patent is extended or adjusted under 35 U.S.C. 154(b) by 103 days.

(21) Appl. No.: 12/998,108

(22) PCT Filed: Jul. 15, 2009

(86) PCT No.: PCT/EP2009/059089
§ 371 (c)(1),
(2), (4) Date: Mar. 17, 2011

(87) PCT Pub. No.: WO2010/037574
PCT Pub. Date: Apr. 8, 2010

(65) Prior Publication Data
US 2011/0169255 A1    Jul. 14, 2011

(30) Foreign Application Priority Data
Oct. 1, 2008  (DE) .......................... 10 2008 042 527

(51) Int. Cl.
*B60R 21/13*    (2006.01)
(52) U.S. Cl.
USPC ...................................... 280/756; 297/216.13
(58) Field of Classification Search
USPC .......... 280/748, 756; 297/113, 115, 112, 114, 297/216.1, 216.13
See application file for complete search history.

(56) References Cited

U.S. PATENT DOCUMENTS

| | | | |
|---|---|---|---|
| 4,840,398 A * | 6/1989 | Matthias et al. | 280/756 |
| 5,941,330 A * | 8/1999 | Miller et al. | 180/89.15 |
| 7,387,313 B2 * | 6/2008 | Beki | 280/756 |
| 2006/0001248 A1 * | 1/2006 | Queveau et al. | 280/756 |
| 2008/0122210 A1 * | 5/2008 | Liesaus et al. | 280/756 |
| 2008/0203717 A1 * | 8/2008 | Helsper et al. | 280/756 |

FOREIGN PATENT DOCUMENTS

| | | |
|---|---|---|
| CA | 2 443 321 A1 | 3/2005 |
| DE | 10 2004 055 405 A1 | 5/2006 |
| DE | 10 2006 028 664 A1 | 1/2007 |
| DE | 10 2005 059 910 B3 | 4/2007 |
| DE | 10 2005 058 910 A1 | 6/2007 |
| DE | 10 2007 005 517 A1 | 9/2008 |
| DE | 10 2007 011 106 A1 | 11/2008 |

* cited by examiner

*Primary Examiner* — Paul N Dickson
*Assistant Examiner* — Timothy Wilhelm
(74) *Attorney, Agent, or Firm* — Miller Canfield Paddock and Stone

(57) ABSTRACT

In the rollover protection system, the rollover body comprises two limbs which, with in each case one end, are pivotable in bearings arranged spaced apart transversely with respect to the vehicle, and which, by means of the other ends thereof which can be pivoted out, can be locked together in the protection position. To increase the support height and support breadth of a system of said type, it is proposed that one of the limbs is designed such that it can be telescopically lengthened. Said limb comprises the telescopic parts which, in the extended state, are locked, so as to be prevented from being retracted again, by means of a spring-loaded bolt in conjunction with a deployable locking element in the pushed-out position.

13 Claims, 3 Drawing Sheets

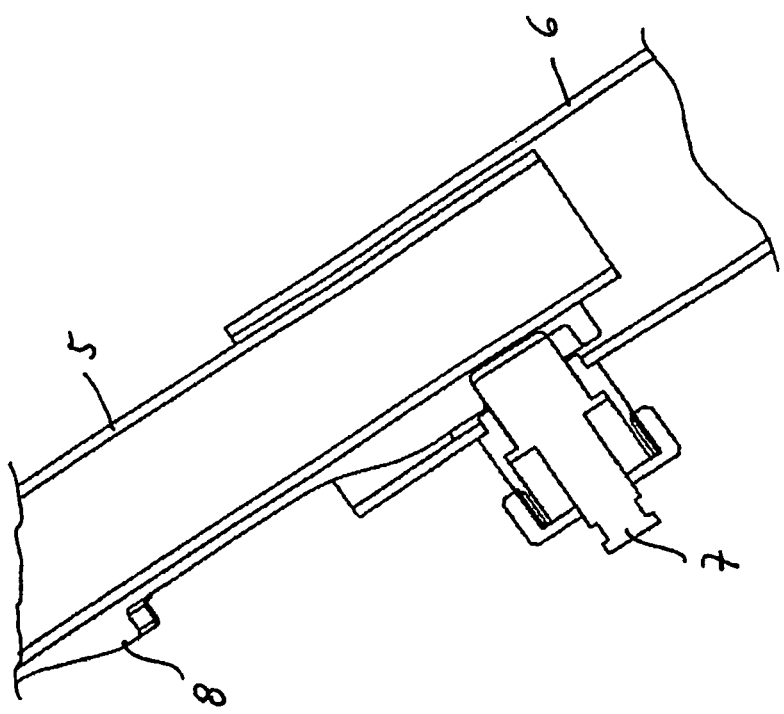

ROLLOVER PROTECTION SYSTEM WITH ROLLOVER BODY WHICH CAN BE PIVOTED OUT

FIELD OF THE INVENTION

The invention relates to a rollover protection system for a motor vehicle seat comprising a rollover body which can be pivoted out by a drive mechanism from a resting position into a protection position, and which is held by a releasable retaining device in the resting position and is secured against pivoting-in again by a locking device in the protection position, the rollover body comprising two limbs which, with in each case one end, are pivotable in bearings arranged spaced-apart, transversely with respect to the vehicle, and which, by means of the other ends thereof which can be pivoted out, can be locked together in the protection position.

BACKGROUND OF THE INVENTION

Rollover bodies with limbs which can be pivoted out have the advantage relative to those with rollover bodies which can be extended in a vertical translatory manner, that a substantially smaller constructional space is sufficient in the direction of extension, and that said rollover bodies in practice do not restrict the loading cross section.

A rollover protection system comprising a foldable rollover bar is disclosed in DE 10 2005 059 910 B3, in which two frame limbs, spaced apart in the transverse axis of the vehicle, are rotatably articulated with one end in bearings and, folding with the free ends thereof, are able to be mutually displaced and in the upright state are coupled in a manner in which they may be locked together.

According to an additional patent application for this protective right (DE 10 2007 011 106 A1) at least one of the two frame limbs in the region of the free end is designed to have a flattened portion.

A further generic rollover protection system has been disclosed in DE 10 2007 005 517 A1. Accordingly, at least one deformation element, formed from at least two partial elements dissipating energy and able to be displaced together, is intended to be incorporated in the rollover body.

Rollover protection systems of this type generally have the drawback that the spacing between the lower points of articulation and bearings respectively of the limbs which can be pivoted out may not be increased in any manner. Instead, for technical and, in particular, visual reasons the spacing is relatively severely restricted. The same also applies to the length of the limbs which can be pivoted out, and which are arranged in the resting position approximately horizontally, transversely to the longitudinal axis of the vehicle. The greatest length which is technically feasible is generally not able to be utilized, in particular, with seat-related rollover protection systems, as exceeding the seat backrest width in the upper region is aesthetically not desirable.

The aforementioned restrictions also have the result that the maximum achievable support height is limited in the pivoted-out state. However, a support height which is as great as possible is desirable in order to be able to provide the largest possible survival space for the passengers, in cooperation with the A-pillar of the vehicle.

SUMMARY OF THE INVENTION

The object of the invention is to overcome the aforementioned drawbacks of the generic rollover protection systems and with a predetermined, relatively tight installation space to permit a considerably greater support height than in the known systems.

This object is achieved according to the invention by one of the limbs being designed such that it can be telescopically extended.

In conventional rollover protection systems, it is not possible for the limb, the end thereof which is able to be pivoted out being guided in the other limb and being locked thereto in the protection position, to be configured to be longer than the distance between the bearing points of the limbs which can be pivoted out. As a result, not only the maximum achievable support height, but also the pivoting-out angle of the other limb is limited.

If, according to the invention, this limb is designed such that it can be telescopically extended, one limb may be accommodated in the constructional space between the two bearing points, said limb in the pivoted-out and extended state respectively being able to be configured to be considerably longer than predetermined by the bearing spacing. If the limb which is telescopically extendable is additionally arranged on the inside of the vehicle, the other limb may be pivoted further in the direction of the outside of the vehicle, so that not only the support height but also the support breadth is increased which has a positive effect on the size of the achievable protection space.

In a further embodiment of the inventive idea, it is provided that at least two telescopic parts are formed in the telescopically extendable limb. Furthermore, it is provided that the telescopic parts may be locked in the protection position.

Expediently, the limb is configured to be telescopic, the pivoting-out end thereof being arranged in the other limb which is of U-shaped configuration in cross section and when pivoted-out is guided in the other limb.

With regard to achieving a support breadth which is as large as possible, the other limb is preferably arranged on the outside of the vehicle.

It may also be provided that the other limb is constructed beyond the locking point reached in the protection position, and that the extended end in the resting position spans the bearing of the extendable limb.

The extended end is expediently configured to be bent inwards and downwards respectively.

Spring-loaded bolts or locking pawls, known per se, are preferably provided for locking the pivoted-out limbs in the protection position and the telescopic parts in the extended position.

BRIEF DESCRIPTION OF THE DRAWINGS

Further details and advantages are explained in more detail with reference to the exemplary embodiment shown in FIGS. 1 to 3, in which:

FIG. 3 shows a detail relating to the locking of the telescopic parts which may be displaced in a translatory manner relative to one another.

DETAILED DESCRIPTION OF THE INVENTION

Figure 1:
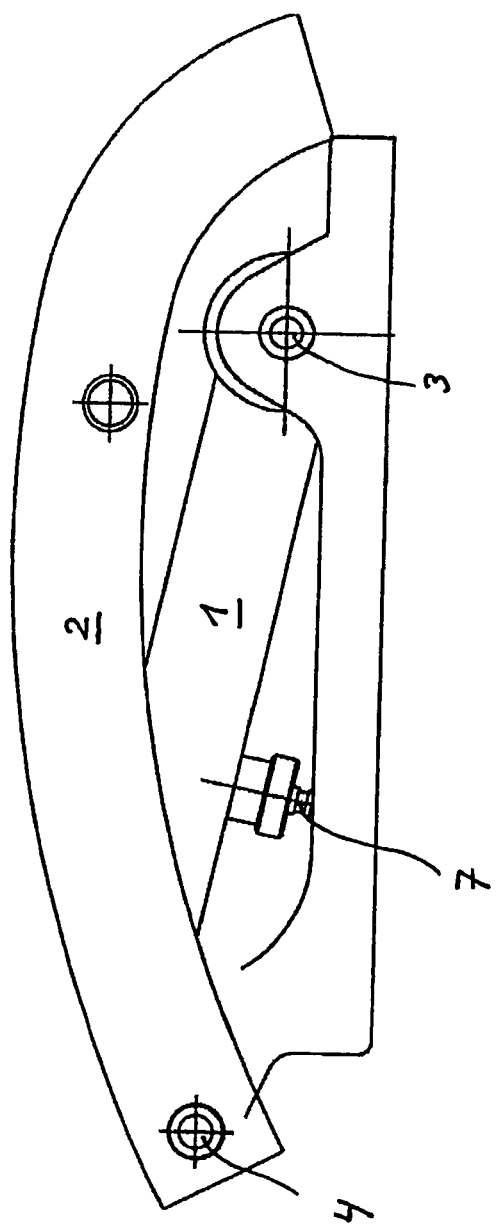
FIG. 1 shows an exemplary embodiment of the invention in the resting position.

The exemplary embodiment shown in FIG. 1 of the rollover protection device according to the invention comprises the limbs 1 and 2, which are mounted in the bearings 3 and 4 so that they can be pivoted out. The exemplary embodiment further comprises a spring-loaded bolt 7 by which the telescopic parts which may be moved relative to one another in a translatory manner may be locked in the protection position.

Figure 2:
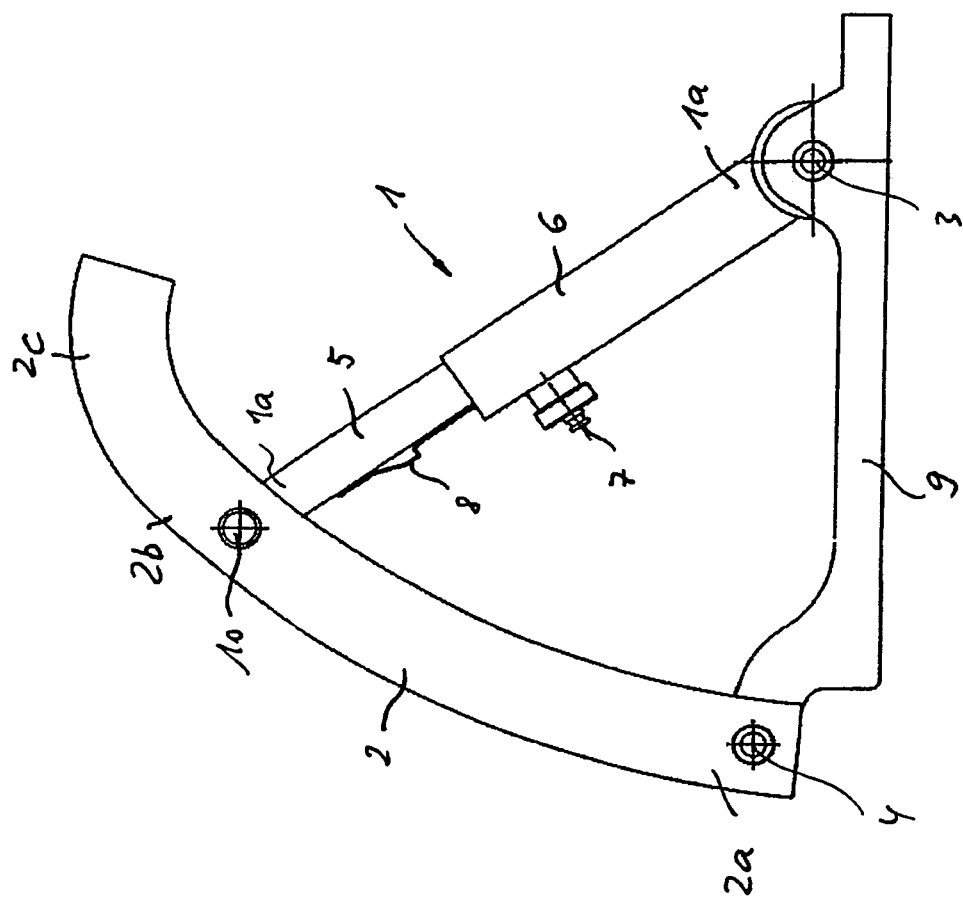
FIG. 2 shows the exemplary embodiment, shown in FIG. 1, in the protection position.

FIG. 2 shows the exemplary embodiment according to FIG. 1 of the rollover protection device according to the invention in the pivoted-out and extended state respectively. The lower end 2a of the limb 2 mounted in the bearing 4 is pivoted-out with its upper end 2b, for which, for example a torsion spring, not shown in more detail, is able to be used in the region of the lower end 1a of the telescopically extendable limb 1. During the pivoting-out movement of the two limbs, the upper end 1a of the telescopically extendable limb 1 is guided from its resting position in the vicinity of the bearing 4 inside the limb 2 of U-shaped configuration to the protection and locked position shown respectively. At the same time, the parts 5 and 6 of the telescopically extendable limb 1 are pulled apart according to the increasing distance from the bearing 3, and in the position shown are locked so as to be prevented from being retracted again by means of a spring-loaded bolt, which cooperates with a saw tooth-shaped locking element 8 fixedly connected to the telescopic part 5. Thus the locking element may be configured with one or more engagement points, in order to prevent if necessary a pivoting back and retraction respectively of the telescopic part 5, even in the not fully extended protection position.

A base part of the rollover protection device is additionally denoted by 9, which is provided for connecting the rollover protection device directly to the vehicle bodywork or indirectly used intermediate part.

The limb 2 which can be pivoted out has an extension 2c reaching considerably beyond the locking point 10 and which is configured to be bent inwards and downwards respectively. In this manner, the achievable support height may be further increased and the cooperation between the pivoted-out rollover protection device and the base on which it is supported in the event of activation, may be improved. Furthermore, the extension 2c serves as a deformation element for dissipating energy.

FIG. 3 shows in detail the point at which the telescopic parts 5 and 6 are locked against being retracted by means of the spring-loaded bolt. Fixedly connected to the telescopic part 5 is a locking element with a saw tooth-shaped contour, the locking bolt, when extended, being pushed further outwards over the oblique surfaces against the pressure of the spring, in order to be able to snap subsequently behind the edges extending perpendicular to the pushed-out direction when extended further.

Naturally, instead of spring-loaded bolts locking pawls or other locking elements may also be used.

What is claimed is:

1. A rollover protection system for a motor vehicle seat comprising: a rollover body which can be pivoted out by a drive mechanism from a resting position into a protection position and which is held by a releasable retaining device in the resting position and is secured against pivoting-in again by a locking device in the protection position, the rollover body comprising two limbs which, with in each case one end, are pivotable in bearings arranged spaced-apart, transversely with respect to the vehicle, and which, by means of the other ends thereof which can be pivoted out, can be locked together in the protection position, wherein one of the limbs is designed such that it can be telescopically extended and includes at least two telescopic parts which may be locked in an extended state by a locking element.

2. The rollover protection system according to claim 1, wherein the pivoting-out end of the telescopically extendable limb is arranged within the other limb which is of U-shaped configuration in cross section and when pivoted out is guided in the other limb.

3. The rollover protection system according to claim 2, wherein the other limb is configured to be extended beyond the locking point reached in the protection position.

4. The rollover protection system according to claim 2, wherein the other limb is oriented on an outer side of the telescopic limb in a vehicle width direction.

5. The rollover protection system according to claim 4, wherein the other limb is configured to be extended beyond the locking point reached in the protection position.

6. The rollover protection system according to claim 5, wherein an extended end of the other limb in the resting position spans a bearing of the extendable limb.

7. The rollover protection system according to claim 6, wherein the extended end is configured to be bent inwards transversely with respect to the vehicle and downwards respectively.

8. The rollover protection system according to claim 7, wherein spring-loaded bolts or locking pawls are provided for locking the pivoted-out limbs in the protection position and the telescopic parts in the extended position.

9. The rollover protection system according to claim 1, wherein the other limb is oriented on an outer side of the telescopic limb in a vehicle width direction.

10. The rollover protection system according to claim 1, wherein an extended end of the other limb in the resting position spans a bearing of the extendable limb.

11. The rollover protection system according to claim 10, wherein the extended end is configured to be bent inwards transversely with respect to the vehicle and downwards respectively.

12. The rollover protection system according to claim 1, wherein spring-loaded bolts or locking pawls are provided for locking the pivoted-out limbs in the protection position and the telescopic parts in the extended position.

13. A rollover protection system for a motor vehicle seat comprising: a rollover body which can be pivoted out by a drive mechanism from a resting position into a protection position and which is held by a releasable retaining device in the resting position and is secured against pivoting-in again by a locking device in the protection position, the rollover body comprising two limbs which, with in each case one end, are pivotable in bearings arranged spaced-apart, transversely with respect to the vehicle, and which, by means of the other ends thereof which can be pivoted out, can be locked together in the protection position, wherein one of the limbs is designed such that it can be telescopically extended and includes at least two telescopic parts which may be locked in an extended state by a locking element, wherein the other limb is configured to be extended beyond the locking point reached in the protection position, and wherein the extended end is configured to be bent inwards transversely with respect to the vehicle and downwards.

* * * * *